Patented Aug. 13, 1940

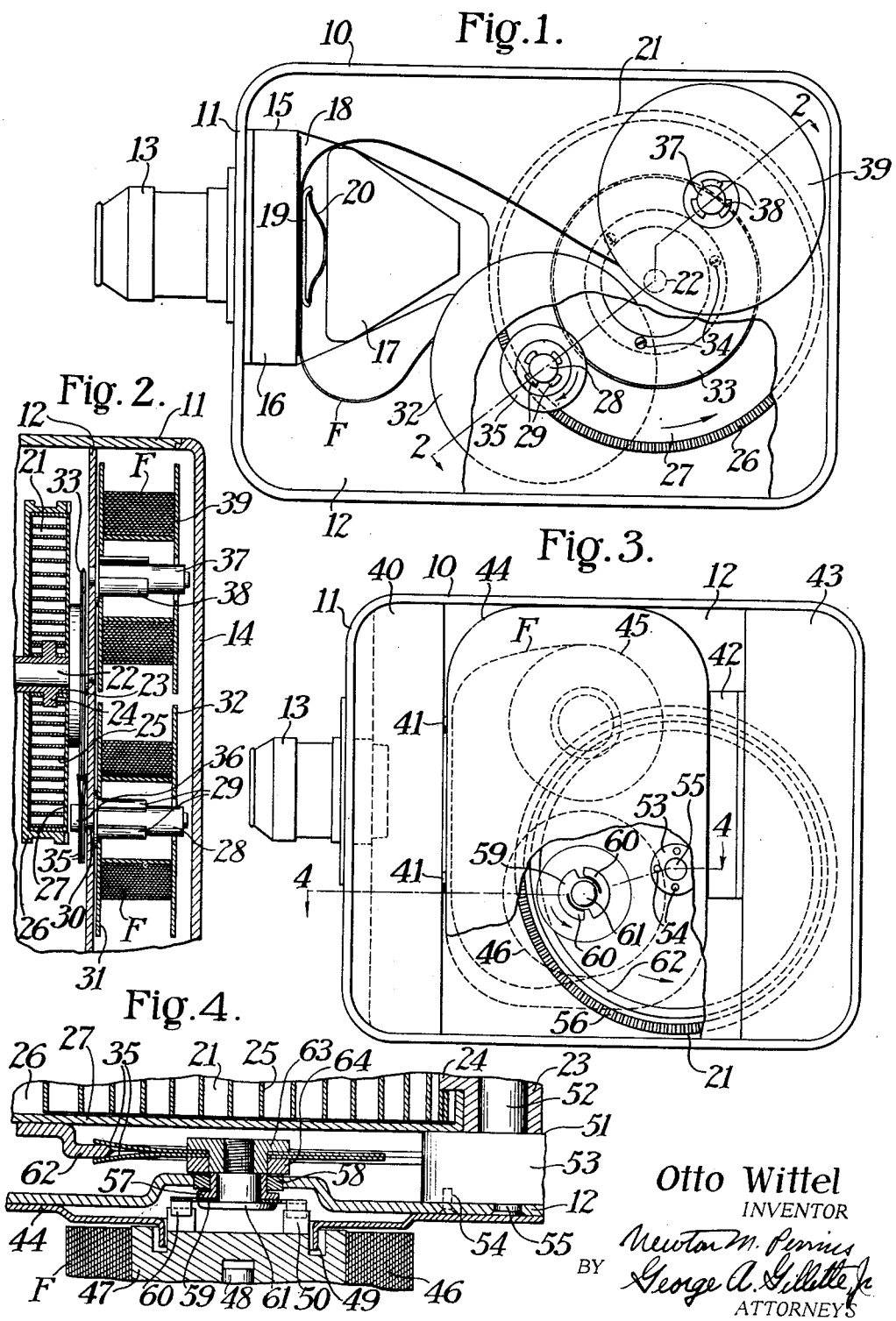

2,211,358

UNITED STATES PATENT OFFICE 2,211,358

TAKE-UP DRIVE FOR PHOTOGRAPHIC APPARATUS

Otto Wittel, Rochester, N. Y., assignor to Eastman Kodak Company, Rochester, N. Y., a corporation of New Jersey Application February 1, 1938, Serial No. 188,130

3 Claims. (Cl. 242—55)

The present invention relates to a take-up drive for a photographic apparatus and more particularly to a simple but effective friction connection directly operated by a prime mover and for rotating a take-up spindle member.

Various types of take-up drives include a friction connection subject to slipping as the diameter of the take-up film roll increases. Such drives include spring belts and many forms of friction clutches interposed between the prime mover and the spindle member. However, such friction clutches are generally inserted as a separate member.

The primary object of the present invention is the provision in a take-up drive of a driving connection in which the friction clutch is simultaneously provided by the elements of the driving connection which includes a circular flange and a pair of flexible resilient discs engaging opposite sides of the flange to constitute a drive.

Another object of the invention is the provision of one member for the friction drive directly upon the spring motor and in direct engagement with the complementary member of the drive carried by the take-up spindle member.

A further object of the invention is the provision either of an externally projecting flange or an internally projecting flange upon the spring motor casing, said flange being engaged by a pair of flexible resilient discs on the spindle member, said discs engaging the externally projecting flange for rotation opposite to that of the spring motor and engaging the internally projecting flange for rotation in the same direction as the rotational direction of the spring motor.

Other and further objects of the invention will be suggested to those skilled in the art by the following description.

The above and other objects of the invention are embodied in a photographic apparatus comprising in combination, a rotatable driving member, rotatable spindle member for operation of a take-up film core or film spool, and a direct driving connection between said members, said connection including a circular flange carried by one of the members and including a pair of flexible resilient discs mounted upon the other member and for frictionally engaging the opposite sides of the flange on the first-mentioned member. More specifically, the driving member may be provided as a spring motor and the circular flange of the driving connection may be mounted upon the casing of such motor.

Reference is made to the accompanying drawing wherein similar reference characters designate similar elements and wherein:

Fig. 1 is a side elevation of a photographic apparatus adapted to receive film spools and equipped with a take-up according to the invention, a portion of the mechanism plate being broken away for better illustration of the internal parts.

Fig. 2 is a partial transverse cross section taken on the line 2—2 of Fig. 1.

Fig. 3 is a side elevation of a photographic apparatus of the magazine type equipped with the take-up drive of the invention and also having the mechanism plate broken away to show the construction of the drive.

Fig. 4 is a fragmentary transverse and enlarged section taken on the line 4—4 of Fig. 3.

Although the invention is illustrated and described with respect to a motion picture type of photographic apparatus, it is to be understood that the invention may also be applied by one skilled in the art to all types of photographic apparatus. Such motion picture apparatus comprises a casing 10 having side walls 11 and an intermediate longitudinally extending mechanism plate 12. An objective assembly 13 is attached to the forward side wall 11. The open side of casing 10 may be enclosed by a cover 14, see Fig. 2.

The spool type photographic apparatus may comprise a mechanism block 15 including a front chamber 16 in which the shutter and film advancing mechanism, not shown, are mounted, includes a triangular chamber 17 in which a centrifugal governor, not shown, may be mounted, and is provided with a channel 18 in which a pressure pad 19 is pressed by a spring member 20 against the rear surface of front chamber 16. The rear surface of front chamber 16 is provided with an exposure aperture, not shown, and the pressure pad 19 maintains the film F against chamber 16 to form a film gate assembly.

The rotatably mounted driving means may comprise a spring motor 21 including a supporting spindle 22 fixedly mounted in mechanism plate 12, a sleeve 23 rotatably mounted on supporting spindle 22 and having a lug 24 to which the inner end of the spiral spring 25 is attached, and all enclosed in a cylindrical casing 26 to which the outer end of spring 25 is attached and which has a flat side wall 27.

The take-up spindle member comprises a spindle 28 having teeth 29 and rotatably mounted at 30 in the mechanism plate 12. The teeth 29 of take-up spindle 28 are adapted to engage a complementary opening in the flange 31 of take-up spool 32 so that said take-up spool 32 may be operated or rotated upon rotation of take-up spindle 28.

A driving connection is interposed between the driving member and the spindle member. Such driving connection comprises an externally projecting circular flange 33 which is attached by screws 34 to the flat side wall 27 of the cylindrical casing 26 of the spring motor 21. Said driving connection also includes a pair of flexible resilient discs 35 which are centrally and concentrically attached to the end of take-up spindle 28 by a bolt 36 threaded into the end of spindle 28. The opposed peripheral margins of discs 35 are separated by or frictionally engage the opposite surfaces of circular flange 33, see Fig. 2. Rotation of said circular flange 33 with the spring motor 21 will cause rotation of flexible resilient discs 35, take-up spindle 28 and take-up spool 32.

A supply spindle 37 has teeth 38, is mounted at its inner end in mechanism plate 12 and is adapted to support a flanged film supply spool 39. During threading of the camera the film F extends from supply spool 39 through channel 18, where it is held in the focal plane of the objective assembly 13 by pressure pad 19, and thence to the take-up spool 32. Upon operation of the spring motor 21 and commonly associated film advancing mechanism, the film F will be unwound from supply spool 39 and wound up on the take-up spool 32 but as the diameter of the take-up film roll increases the take-up drive must slip so that the take-up will not be drawing the film continuously through the film gate. According to the present invention such slipping occurs between the frictionally engaging surfaces of circular flange 33 and flexible resilient discs 35. Thus a simple but effective slip drive connection is provided between the spring motor 21 and the take-up spindle 28, the direct engagement of the elements in the driving connection contributing to such simplicity thereof.

The form of the take-up drive just described results in opposite rotation of the spring motor 21 and take-up spindle 28 as indicated by the arrows in Fig. 1. However, the take-up drive of the invention may also be designed so that the spring motor and take-up spindle member rotate in the same direction. This modification is shown in Figs. 3 and 4 in connection with a magazine type of photographic apparatus, although it is to be understood that either form of the drive may be used with either a spool loading or magazine type of photographic apparatus.

Referring now to Figs. 3 and 4, the front housing 40 encloses the shutter and film advancing mechanism, not shown, and carries on its rear surface a pair of locating studs 41. A positioning member 42 is mounted on the rear housing 43 and resiliently urges the film magazine 44 into position against the locating studs 41. The film magazine contains a rotatably mounted supply film roll 45 from which the film F extends through a film gate in the magazine and to a take-up film roll 46. The take-up film roll 46 is wound upon a core 47 rotatably mounted in the film magazine between a spindle 48 and a collar 49 formed in the side wall of magazine 44. Driving teeth 50 are provided on one end of core 47 and extend through the opening encircled by the collar 49 in the side of film magazine 44, see Fig. 4. The camera construction thus far described is of known design.

The driving member again may comprise a spring motor 21 rotatably mounted upon a support 51 including a spindle 52 and a base 53 which is fastened to mechanism plate 12 by a plurality of screws 54 and centered by a dowel 55. As before, the spring motor 21 includes a sleeve 23 having a lug 24 to which the inner end of spiral spring 25 is attached and also includes a cylindrical casing 26 to which the outer end of spring 25 is connected, having a flat side wall 27 and including a crown gear 56. The spring 25 may be placed under tension by winding in a conventional manner whereupon the spring motor 21 will tend to rotate in the direction of the arrow shown in Fig. 3.

The spindle member for the magazine type of apparatus comprises a bushing 57 journaled in a bearing 58 in mechanism plate 12 and includes a clutch member 59 which has resilient ears 60 bent out of the plane of clutch member 59 for engagement with the teeth 50 on the end of film core 47 and which is secured to bushing 57 by a headed bolt 61.

The driving connection comprises an internally projecting circular flange 62 attached to the flat side wall 27 of the cylindrical casing 26 for the spring motor 21. Said driving connection also consists of a pair of circular, flexible and resilient discs 35 which are centrally and concentrically connected to the spindle member by a nut member 63 threaded onto the end of headed bolt 61. Said nut member 63 has a shoulder against which the discs 35 are held by a collar 64 which is press-fitted onto nut member 63 firmly to secure the discs 35 thereto. The disc members 35 have their peripheral margins engaging the opposite surfaces of the internal circular flange 62, the inner edge of said flange 62 being beveled, see Fig. 4, to facilitate insertion of the flange between discs 35 during assembly of the mechanism.

It will be apparent that an extremely simple and direct friction driving connection is thus provided, the principal difference in this modification being the rotation of the spindle member in the same direction as the prime mover or spring motor.

Although the resilient discs 35 have been shown in each instance as being mounted upon the spindle member, it is pointed out that provision of resilient flanges on the spring motor casing 26 and of a rigid circular flange on the spindle member would be a mere reversal of parts and is within the scope of the present invention. It is also pointed out that the form of connection between the spindle member and the film spool or film core may be interchanged or may be varied according to any of the known forms. In short, the present disclosure is only illustrative and the scope of the invention is defined by the appended claims.

Having particularly described my invention, what I desire to secure by Letters Patent of the United States and what I claim is:

1. In a photographic apparatus, the combination with a rotatable driving means including a rotatable cylindrical casing and a spring motor therein, and a spindle rotatably mounted and adapted to operate a take-up film core, of a driving connection including a circular flange on the casing of said driving means and including a pair of flexible resilient discs carried by said spindle, the opposed peripheral margins of said discs frictionally engaging the opposite surfaces of said flange.

2. In a photographic apparatus, the combination with a rotatable driving means including a rotatable cylindrical casing and a spring motor therein, and a spindle rotatably mounted and adapted to operate a take-up film core, in externally projecting circular flange on the casing for said spring motor and including a pair of flexible resilient discs carried by said spindle, the opposed peripherial margins of said discs frictionally engaging the opposite surfaces of said externally projecting flange.

3. In a photographic apparatus, the combination with a rotatable driving means including a rotatable cylindrical casing and a spring motor therein, and a spindle rotatably mounted and adapted to operate a take-up film core, of a driving connection including an internally projecting circular flange on the casing for said spring motor and including a pair of resilient flexible discs carried on said spindle within said circular flange, the opposed peripherial margins of said discs frictionally engaging the opposite surfaces of said internally projecting flange.

OTTO WITTEL.